US012694491B2

(12) United States Patent
Kirsten

(10) Patent No.: US 12,694,491 B2
(45) Date of Patent: Jul. 28, 2026

(54) DOCUMENT-OCCLUDING ARTIFACT REMOVAL

(71) Applicant: Hewlett-Packard Development Company, L.P., Spring, TX (US)

(72) Inventor: Lucas Nedel Kirsten, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 388 days.

(21) Appl. No.: 18/024,767

(22) PCT Filed: Oct. 12, 2020

(86) PCT No.: PCT/US2020/055217
§ 371 (c)(1),
(2) Date: Mar. 5, 2023

(87) PCT Pub. No.: WO2022/081126
PCT Pub. Date: Apr. 21, 2022

(65) Prior Publication Data
US 2024/0029213 A1     Jan. 25, 2024

(51) Int. Cl.
*G06T 5/00*     (2024.01)
*G06T 5/77*     (2024.01)
*G06T 7/11*     (2017.01)
*G06T 7/50*     (2017.01)
*G06V 30/10*    (2022.01)

(52) U.S. Cl.
CPC .................. *G06T 5/77* (2024.01); *G06T 7/11* (2017.01); *G06T 7/50* (2017.01); *G06V 30/10* (2022.01)

(58) Field of Classification Search
CPC .... G06T 5/77; G06T 7/50; G06T 7/11; G06V 30/10
See application file for complete search history.

(56) References Cited

U.S. PATENT DOCUMENTS

| | | | |
|---|---|---|---|
| 6,697,536 B1 | 2/2004 | Yamada | |
| 8,447,096 B2 * | 5/2013 | Klein Gunnewiek | ...................... H04N 13/194 348/169 |
| 9,373,160 B2 * | 6/2016 | Fergus | ...................... G06T 5/60 |
| 10,803,350 B2 * | 10/2020 | Ma | ........................ G06F 18/285 |

(Continued)

FOREIGN PATENT DOCUMENTS

| | | |
|---|---|---|
| CN | 106204536 A | 12/2016 |
| EP | 3537378 A1 | 9/2019 |

(Continued)

OTHER PUBLICATIONS

Barnes, C.et al., "PatchMatch: A Randomized Correspondence Algorithm for Structural Image Editing" ACM Transactions on Graphics, (Proc. SIGGRAPH), Aug. 2009, pp. 12.

(Continued)

*Primary Examiner* — Gregory M Desire
(74) *Attorney, Agent, or Firm* — Michael Dryja

(57)     ABSTRACT

Depth information for each pixel of a digitally captured image of a document occluded by an object is determined. The pixels the pixels for which the depth information is indicative of a greater depth than a baseline depth of the document are identified as belonging to an artifact corresponding to the object occluding the document. The artifact is removed from the digitally captured image.

13 Claims, 7 Drawing Sheets

(56)        References Cited

U.S. PATENT DOCUMENTS

| | | | |
|---|---|---|---|
| 11,074,679 B2 * | 7/2021 | Wang | G06V 10/768 |
| 11,410,278 B2 * | 8/2022 | Goel | G06V 10/443 |
| 11,593,585 B2 * | 2/2023 | Ma | G06T 7/0002 |
| 2012/0120444 A1 | 5/2012 | Hirohata et al. | |
| 2013/0272602 A1 | 10/2013 | He et al. | |
| 2015/0319425 A1 | 11/2015 | Lu | |
| 2016/0232405 A1 | 8/2016 | Iwayama | |
| 2019/0108396 A1 | 4/2019 | Dal Mutto et al. | |
| 2019/0164259 A1 | 5/2019 | Lian | |
| 2019/0392632 A1 | 12/2019 | Han et al. | |

FOREIGN PATENT DOCUMENTS

| | | |
|---|---|---|
| JP | 2000-308045 A | 11/2000 |
| TW | M508084 U | 9/2015 |

OTHER PUBLICATIONS

Telea, Alexandru, "An Image Inpainting Technique Based on the Fast Marching Method", J. Graphics Tools, vol. 9, No. 1, Jan. 2004, pp. 13.

* cited by examiner

FIG 1

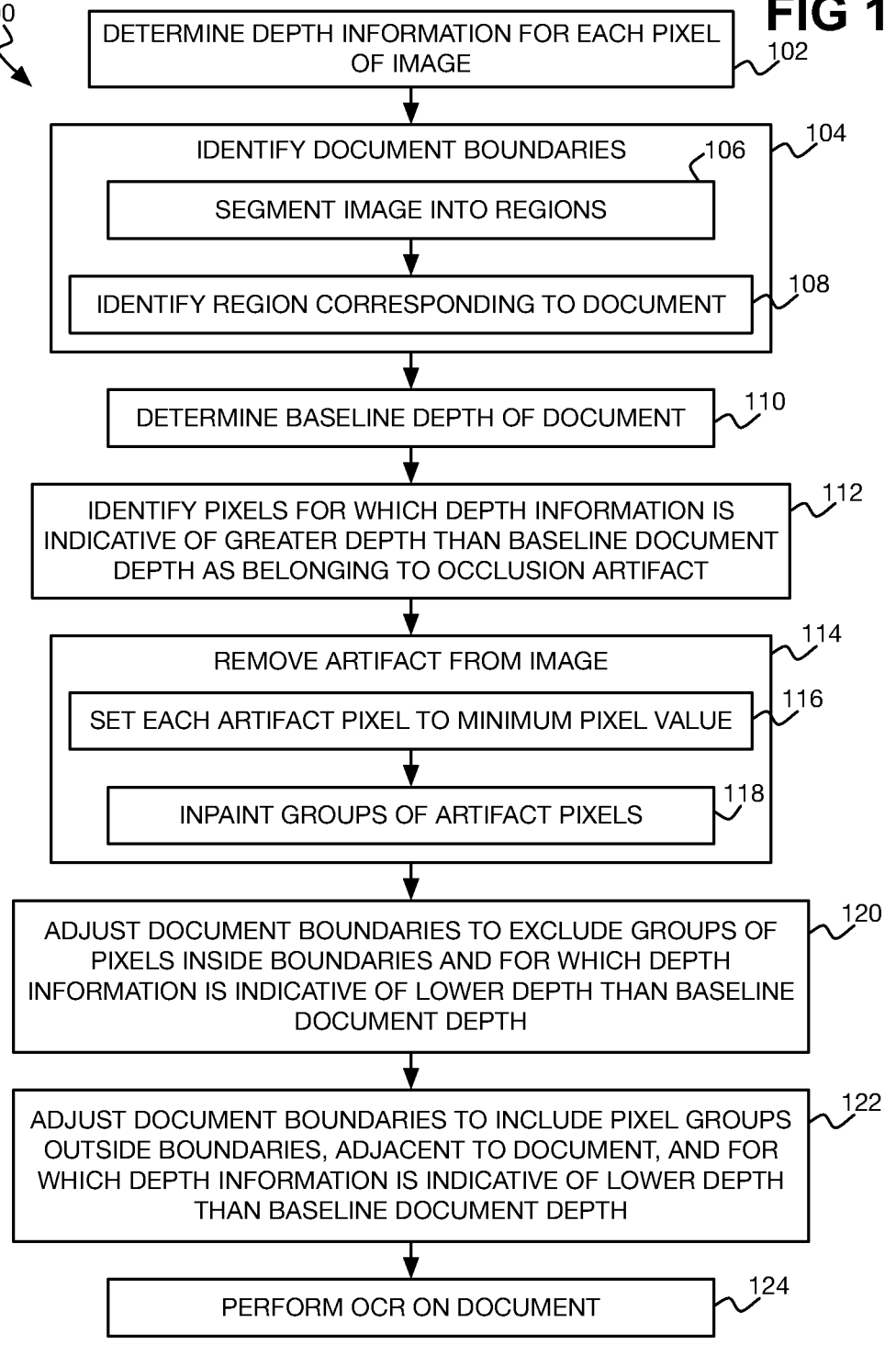

100

DETERMINE DEPTH INFORMATION FOR EACH PIXEL OF IMAGE — 102

IDENTIFY DOCUMENT BOUNDARIES — 104

106 —
SEGMENT IMAGE INTO REGIONS

IDENTIFY REGION CORRESPONDING TO DOCUMENT — 108

DETERMINE BASELINE DEPTH OF DOCUMENT — 110

IDENTIFY PIXELS FOR WHICH DEPTH INFORMATION IS INDICATIVE OF GREATER DEPTH THAN BASELINE DOCUMENT DEPTH AS BELONGING TO OCCLUSION ARTIFACT — 112

REMOVE ARTIFACT FROM IMAGE — 114

SET EACH ARTIFACT PIXEL TO MINIMUM PIXEL VALUE — 116

INPAINT GROUPS OF ARTIFACT PIXELS — 118

ADJUST DOCUMENT BOUNDARIES TO EXCLUDE GROUPS OF PIXELS INSIDE BOUNDARIES AND FOR WHICH DEPTH INFORMATION IS INDICATIVE OF LOWER DEPTH THAN BASELINE DOCUMENT DEPTH — 120

ADJUST DOCUMENT BOUNDARIES TO INCLUDE PIXEL GROUPS OUTSIDE BOUNDARIES, ADJACENT TO DOCUMENT, AND FOR WHICH DEPTH INFORMATION IS INDICATIVE OF LOWER DEPTH THAN BASELINE DOCUMENT DEPTH — 122

PERFORM OCR ON DOCUMENT — 124

HISTOGRAM OF PIXELS WITHIN REGION 208
BOUNDED BY BOUNDARIES 212A-212D

FIG 3

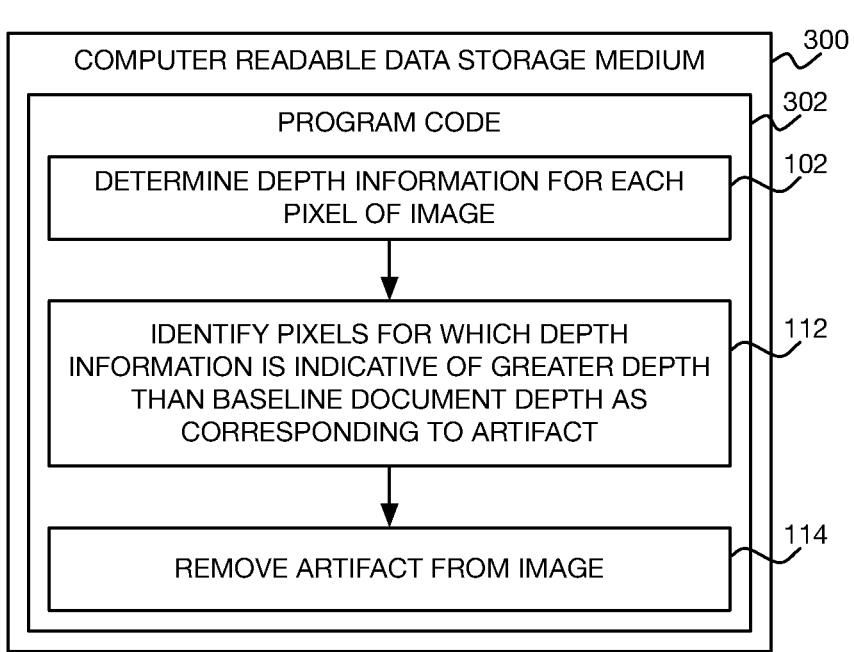

COMPUTER READABLE DATA STORAGE MEDIUM ⌇ 300

PROGRAM CODE ⌇ 302

DETERMINE DEPTH INFORMATION FOR EACH PIXEL OF IMAGE ⌇ 102

IDENTIFY PIXELS FOR WHICH DEPTH INFORMATION IS INDICATIVE OF GREATER DEPTH THAN BASELINE DOCUMENT DEPTH AS CORRESPONDING TO ARTIFACT ⌇ 112

REMOVE ARTIFACT FROM IMAGE ⌇ 114

FIG 4

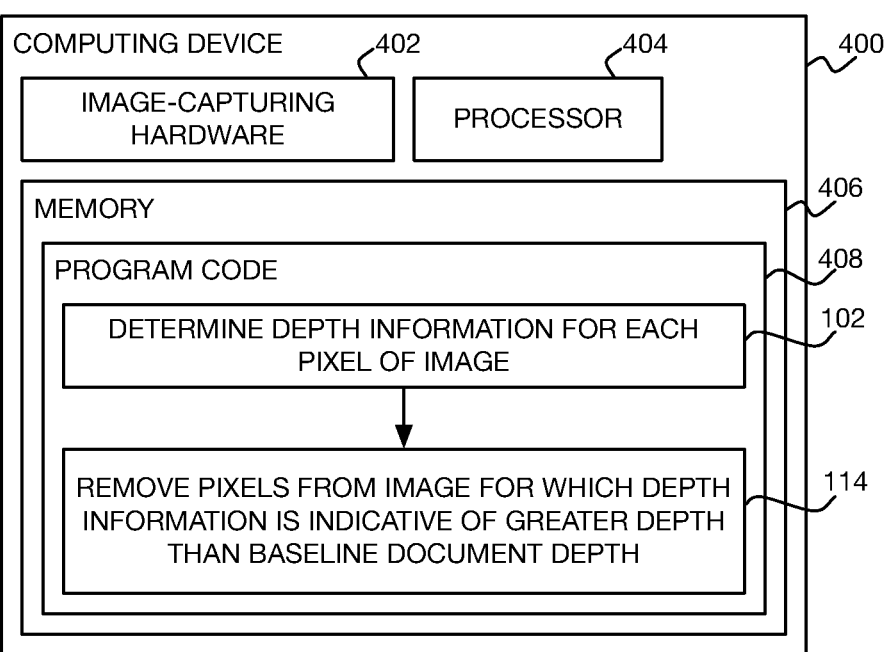

COMPUTING DEVICE ⌇ 400

IMAGE-CAPTURING HARDWARE ⌇ 402

PROCESSOR ⌇ 404

MEMORY ⌇ 406

PROGRAM CODE ⌇ 408

DETERMINE DEPTH INFORMATION FOR EACH PIXEL OF IMAGE ⌇ 102

REMOVE PIXELS FROM IMAGE FOR WHICH DEPTH INFORMATION IS INDICATIVE OF GREATER DEPTH THAN BASELINE DOCUMENT DEPTH ⌇ 114

DOCUMENT-OCCLUDING ARTIFACT REMOVAL

BACKGROUND

While information is increasingly communicated in electronic form with the advent of modern computing and networking technologies, physical documents, such as printed and handwritten sheets of paper and other physical media, are still often exchanged. Such documents can be converted to electronic form by a process known as optical scanning. Once a document has been scanned as a digital image, the resulting image may be archived, or may undergo further processing to extract information contained within the document image so that the information is more usable. For example, the document image may undergo optical character recognition (OCR), which converts the image into text that can be edited, searched, and stored more compactly than the image itself.

BRIEF DESCRIPTION OF THE DRAWINGS

FIG. 1 is a flowchart of an example method for removing occlusion artifacts from a digitally captured image of a document.

FIG. 3 is a diagram of an example non-transitory computer-readable data storage medium storing program code for removing occlusion artifacts from a digitally captured image of a document.

FIG. 4 is a diagram of an example computing device for removing occlusion artifacts from a digitally captured image of a document.

DETAILED DESCRIPTION

Figure 2A:
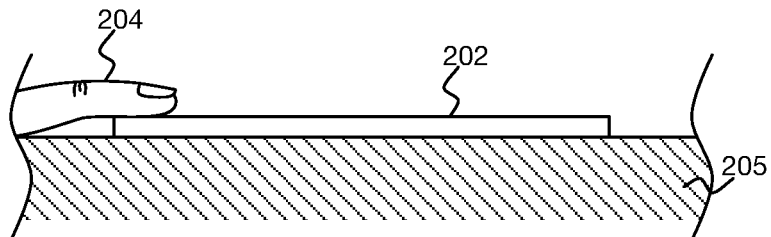
FIGS. 2A-2I are diagrams illustrating example performance of the method of the method of FIG. 1.

As noted in the background, a physical document can be scanned as a digital image to convert the document to electronic form. Traditionally, dedicated scanning devices have been used to scan documents to generate (i.e., capture) images of the documents. Such dedicated scanning devices include sheetfed scanning devices, flatbed scanning devices, and document camera scanning devices. More recently, with the near ubiquitousness of smartphones and other usually mobile computing devices that include image-capturing sensors, documents are often scanned with such non-dedicated scanning devices.

During image capture of a document, the document may be obstructed (i.e., occluded) by a variety of different objects. Dirt, dust, and other debris may be present on the document, and paperclips, binder clips, staples, and other types of sheet fasteners may not be removed prior to image capture. Other types of objects may also block portions of the document during scanning. For example, a user may capture an image of the document using a smartphone held in one hand while holding the document in the other hand. In these and other cases, the document image can include occlusion artifacts corresponding to where the document has been obstructed by various objects. Such artifacts can decrease image quality, and thus may, for instance, decrease optical character recognition (OCR) performance.

Techniques described herein can remove occlusion artifacts within an image of a document that result from objects situated between the camera used to digitally capture the image and the surface of the document. Specifically, pixels for which determined depth information is indicative of a greater depth than the baseline document depth are identified as belonging to an occlusion artifact and removed. Subsequently performed actions on the document, such as printing and viewing the document, as well as OCR, can therefore have increased performance.

FIG. 1 shows an example method 100 for removing an occlusion artifact from a digitally captured image of a document. The method 100 may be implemented as program code stored on a non-transitory computer-readable data storage medium and executable by a processor of a computing device. The computing device may be the same or different device that digitally captured the document image. For example, the computing device may be a smartphone or other mobile or other computing device having a camera used to capture the image, or a standalone scanning device or all-in-one (AIO) device having scanning functionality and that has an image-capturing sensor, which may also be considered a camera. The computing device may instead be a desktop, notebook, laptop, or server computer, for instance, that is communicatively connected to the device that digitally captured the document image.

The method 100 includes determining depth information for each pixel of the digitally captured image of the document (102). The depth information of a pixel is indicative of the depth of the object represented by the pixel relative to infinite focal length. For example, the document may be placed on a table or other surface and be occluded by dirt, dust, debris, a sheet fastener, a finger, or another object. Pixels representing the table or background have lower depth than pixels representing the document, and pixels representing the occluding object have greater depth than pixels representing the document.

The depth information for the pixels of the document image may be determined using a variety of different techniques. Such techniques may provide a depth image corresponding to the document image, with each pixel of the depth image having a value corresponding to the depth of the object represented by a corresponding pixel within the document image. Example techniques that can be used are described in D. Mwiti, "Research guide for depth estimation with deep learning," heartbeat.fritz.ai/research-guide-for-depth-estimation-with-deep-learning-1a02a4396834" (Sep. 25, 2019).

Figure 2B:
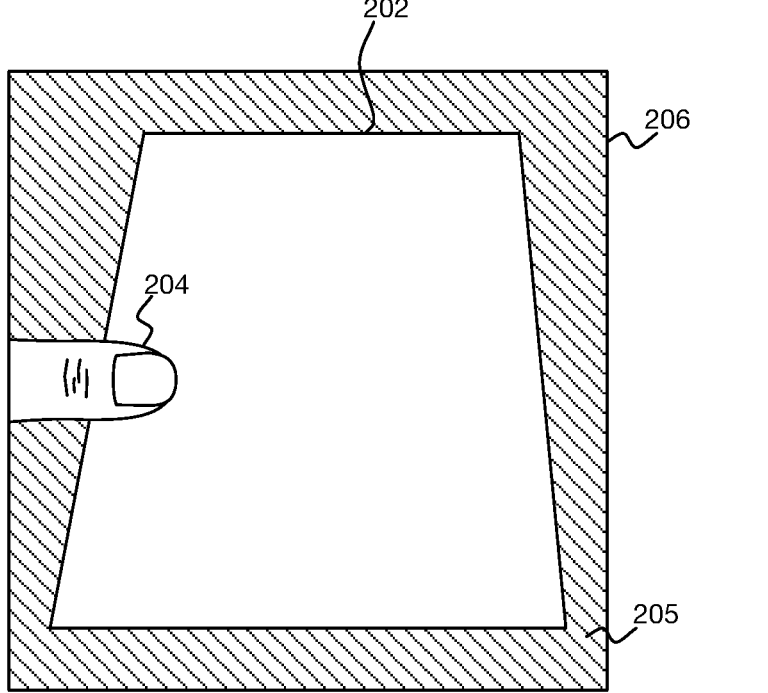

FIG. 2A shows an example document 202, which may include text and other information, maintained in position by an object 204 (specifically a finger) against a surface 205, and FIG. 2B shows an example digitally captured image 206 of the document 202. The document 202 resting on the surface 205 is thus occluded by the object 204 in the image 206. The document 202 can include text and other information. Due to the three-dimensional (3D) perspective of the camera relative to the document 202 during image capture, the two-dimensional (2D) surface of the document 202 is slightly distorted from rectangular and instead is slightly trapezoidal in the image 206. The depth of the pixels within the image 206 corresponding to the document 202 is greater than the depth of the image pixels corresponding to the background surface 205 and less than the depth of the image pixels corresponding to the occluding object 204.

Referring back to FIG. 1, the method 100 can include identifying boundaries of the document within the digitally captured image (104). Pixels inside the boundaries are nominally part of the document, whereas pixels outside the boundaries are nominally not part of the document. However, some pixels inside the boundaries may represent the background (e.g., table surface), depending on how accurately the boundaries are identified. Similarly, some pixels outside the boundaries may represent the document depending on the accuracy of boundary identification.

The document boundaries within the image may be identified in one implementation by segmenting the image into regions (106), and identifying the region corresponding to the document (108). The document image may be segmented into regions without utilizing the previously determined depth information. The boundaries of the identified segmented region corresponding to the document are the document boundaries within the image. The segmented document region may be polygonal in shape, such as a quadrilateral like a trapezoid or a rectangle. Such a segmented document region therefore has linear boundaries that adjacent pairs of which each meet at a corner. In other implementations, the boundaries may not be linear.

A variety of different segmentation techniques may be used to segment the image into regions, and in some cases the segmentation technique may itself identify which segmented region corresponds to the document. In other cases, the segmentation technique may distinguish text from non-text areas of the document, and a polygonal bound box drawn around the identified textual regions to determine the boundaries of the document. One example segmentation technique is described in J. Fan, "Enhancement of camera-captured document images with watershed segmentation," in Proceedings of the International Workshop on Camera-Based Document Analysis and Recognition (CBDAR) (2007).

Figure 2C:
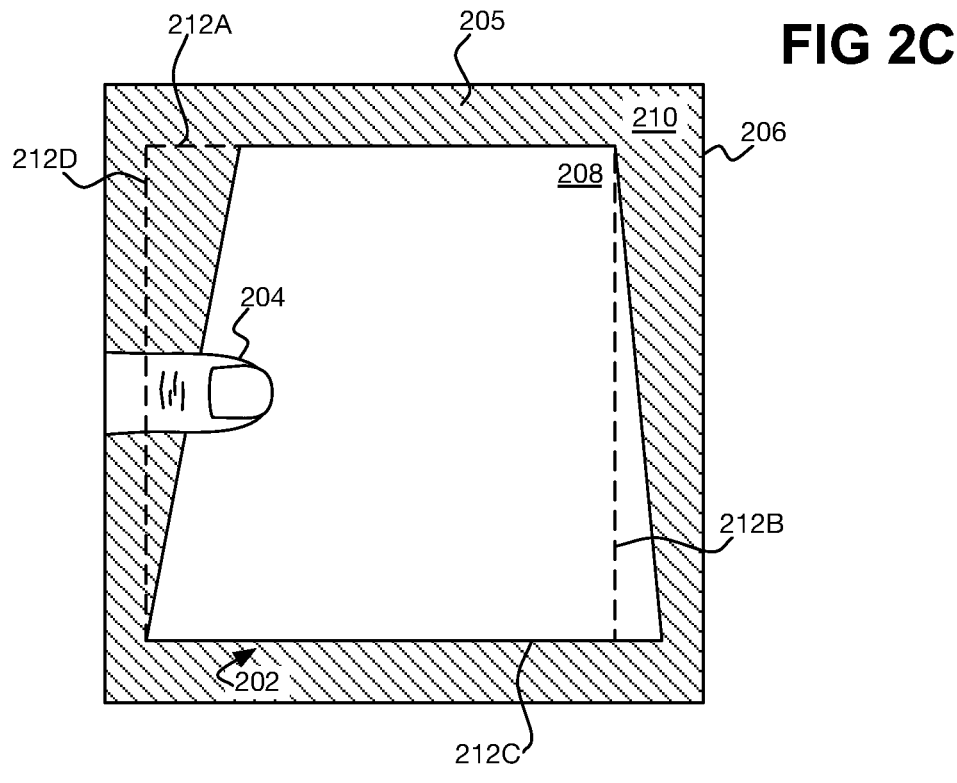

FIG. 2C shows example segmentation of the image 206. The image 206 has been segmented into regions 208 and 210. The segmented region 208 nominally corresponds to the document 202, whereas the segmented region 210 nominally corresponds to the background surface 205. The occluding object 204 spans both segmented regions 208 and 210, with one part of the object 204 in the region 208 and the other part in the region 210. The document region 208 has boundaries 212A, 212B, 212C, and 212D, which are collectively referred to as the boundaries 212.

In the example of FIG. 2C, the boundaries 212 of the segmented region 208 corresponding to the document 202 do not result in the region 208 perfectly aligning with the actual document 202. Rather, a lower-right portion of the document 202 extends outside the region 208. Furthermore, an upper-left portion of the region 208 extends past the document 202. This may be because, although the document 202 is trapezoidal in the image 206 due to the 3D perspective of the camera relative to the document 202 during image capture, the boundaries 212 are identified so that the resulting segmented region 208 is rectangular. However, in other cases, the boundaries 212 of the region 208 may be more or completely correctly aligned with the document 202, such as at the left and/or right sides of the document 202 in FIG. 2C.

Referring back to FIG. 1, the method 100 can include determining the baseline depth of the document within the digitally captured image (110), from the depth information for the pixels inside the identified document boundaries. The baseline document depth can be determined in a number of different ways. For instance, the baseline depth may be determined as the most frequent depth indicated by the depth information for the pixels inside the document boundaries, within a threshold.

Figure 2D:
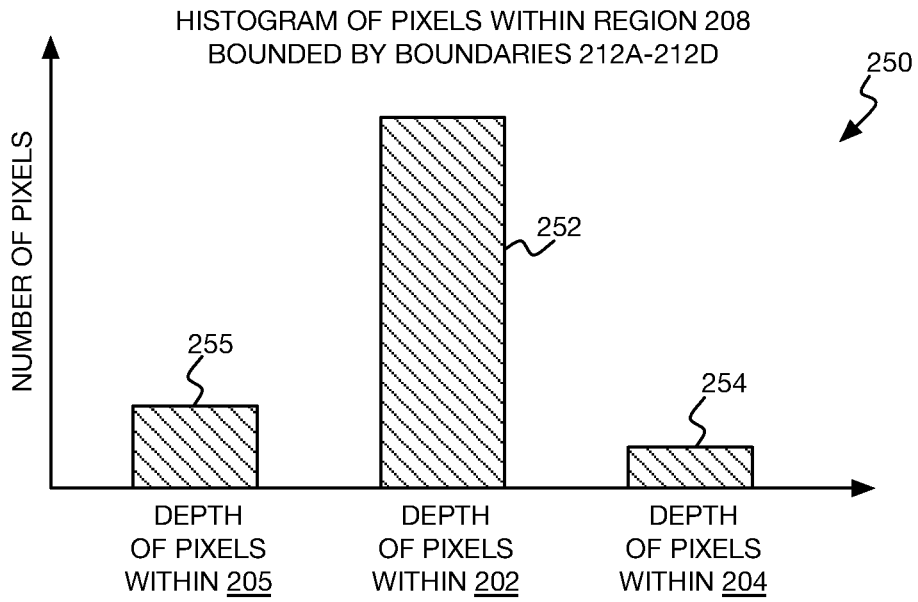

FIG. 2D shows an example histogram 250 of the pixels within the document region 208 bounded by the boundaries 212 of FIG. 2C. The bar 252 corresponds to the pixels inside the boundaries 212 that represent the document 202, the bar 254 corresponds to the pixels inside the boundaries 212 that represent the occluding object 204, and the bar 256 corresponds to the pixels inside the boundaries 212 that represent the background surface 205. The bar 254 corresponds to more pixels than the bars 254 and 256, because the document 202 occupies most of the region 208.

The depth information for the pixels representing the document 202 inside the boundaries 212 is indicative of the baseline depth of the document 202 within a threshold or margin. The baseline document depth may thus be specified as a range of depths inclusive of the depth of these document pixels, for instance. The document pixels may not have identical depth, because the document 202 may not be lying perfectly flat on the surface 205, or due to imprecision resulting from the technique used to determine the depth information. The depth information for the fewer pixels representing the surface 205 inside the boundaries 212 is indicative of a lower depth than the baseline document depth, and the depth information for the fewer pixels representing the object 204 inside the boundaries 212 is indicative of a greater depth than this baseline depth.

Referring back to FIG. 1, the method 100 includes identifying the image pixels for which the depth information is indicative of greater depth than the baseline document depth as belonging to an occlusion artifact that corresponds to the occluding object (112). Just the pixels inside the document boundaries for which the depth information is indicative of such greater depth may be identified as belonging to the occlusion artifact. The pixels outside the boundaries for which the depth information is indicative of greater depth than the baseline depth may also be identified as part of the artifact.

Figure 2E:
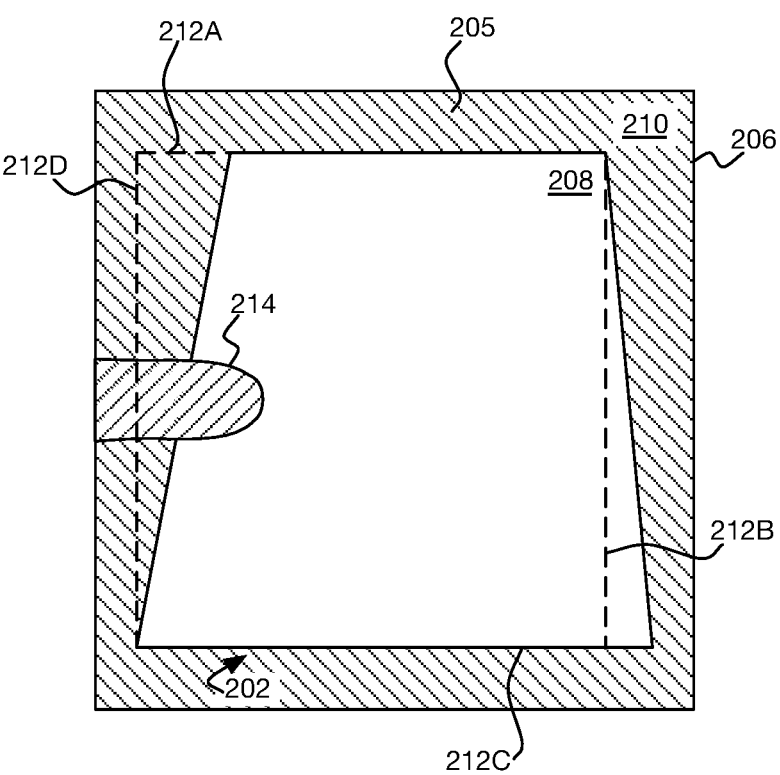

FIG. 2E shows example identification of an occlusion artifact 214 within the image 206. The occlusion artifact 214 corresponds to the occluding object 204 of FIGS. 2B and 2C. In the example, the artifact 214 has been identified as including the pixels both inside and outside the document boundaries 212 for which the depth information is indicative of greater depth than the baseline depth of the pixels representing the document 202 inside the boundaries 212. These pixels represent the object 204 in FIGS. 2B and 2C. The artifact 214 does not include the pixels representing the background surface 205 because the depth information for such pixels is indicative of a lower depth than the baseline document depth.

Referring back to FIG. 1, the method 100 includes removing the identified occlusion artifact from the digitally captured image of the document (114). Artifact removal may be performed by setting each artifact pixel to a minimum pixel value (116). For instance, each image pixel identified as belonging to the occlusion artifact may be set to a pixel value corresponding to black. In one implementation, artifact removal may also include inpainting groups of pixels that have been set to the minimum pixel value (118). Inpainting is the process of reconstructing unavailable (i.e., lost) parts of an image.

A variety of different inpainting techniques may be used to inpaint the artifact pixels that have been set to the minimum pixel value. The inpainting techniques may consider the neighboring pixels to each individual group of contiguous artifact pixels to set the pixel values of the artifact pixels to values more representative of corresponding lost information within the image. More particularly, the original pixel values of the groups of pixels may be specified as an extra channel of the image, with these artifact pixels then inpainted consideration their original pixel values as well as the pixel values of their neighboring pixels. One example inpainting technique is described in C. Barnes et al., "PatchMatch: A randomized correspondence algorithm for structural image editing," ACM Transactions on Graphics (July 2009).

Figure 2F:
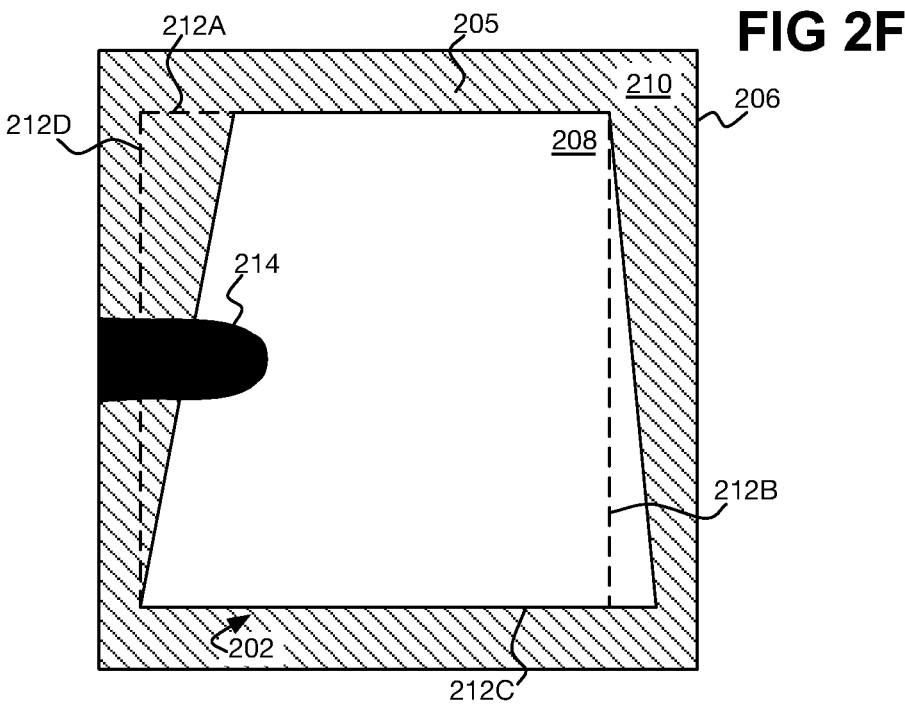
Figure 2G:
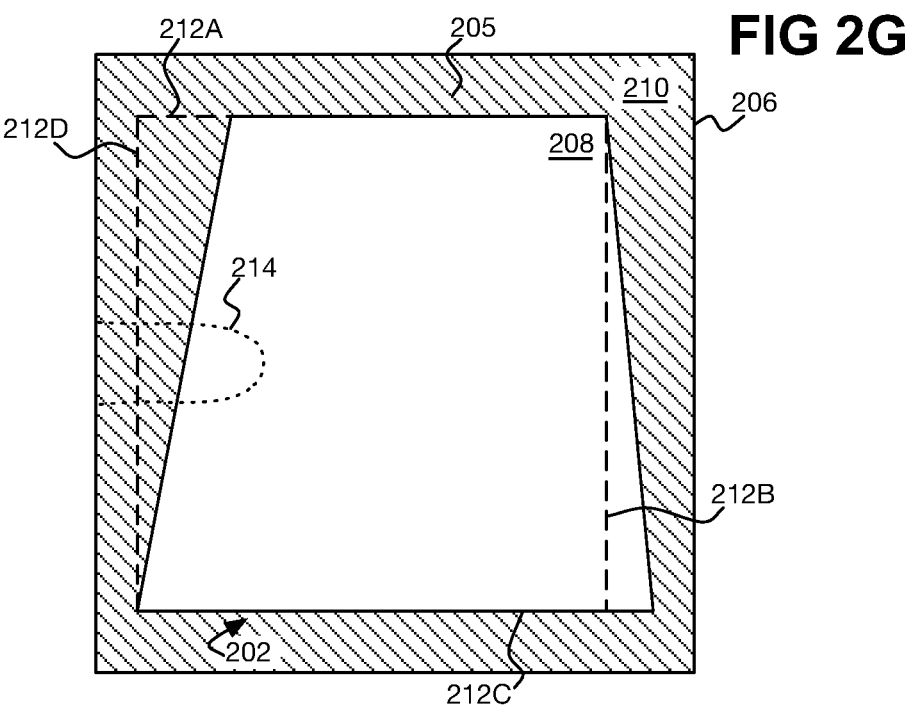

FIGS. 2F and 2G show example removal of the occlusion artifact 214 from the image 206. In FIG. 2F, the pixels both inside and outside the document boundaries 212 that belong to the artifact 214 have each been set to a pixel value corresponding to black. In FIG. 2G, these black pixels have been inpainted. Specifically, the artifact pixels inside the document 202 have been set to pixel values corresponding to the background pixels of the document 202 (e.g., the pixels that do not correspond to text or other information), and the artifact pixels outside the document 202 have been set to pixel values corresponding to the pixels of the background surface 205.

Referring back to FIG. 1, the method 100 can include adjusting the document boundaries to exclude groups of pixels inside the boundaries and for which the depth information is indicative of a lower depth than the baseline depth of the document (120). Such boundary adjustment better aligns the identified boundaries with the actual document captured within the image, so that the document region includes fewer parts of the image background (e.g., table surface). The method 100 can also or instead include adjusting the boundaries to include groups of pixels outside the boundaries, which are adjacent to the document within the digitally captured image, and for which the depth information is indicative of the baseline document depth (122). Such adjustment also better aligns the boundaries with the document, so that the corresponding document region includes more parts of the document.

Figure 2H:
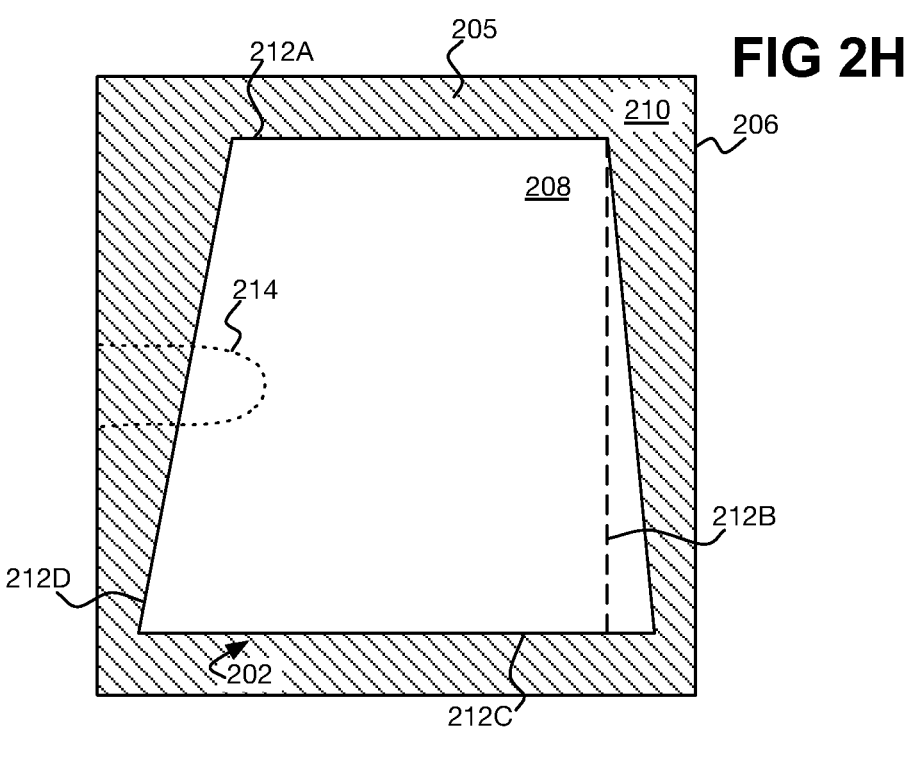
Figure 2I:
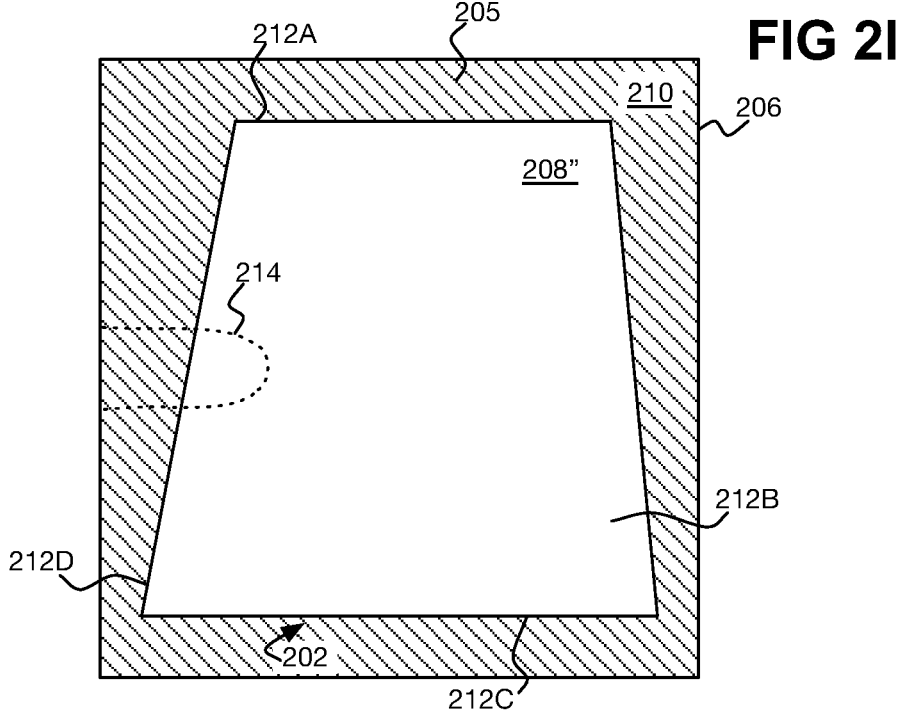

FIGS. 2H and 2I show example document boundary adjustment. In FIG. 2H, the boundary 212D has been rotated clockwise within the image 206 and the boundary 212A shortened to exclude pixel groups having a depth less than the baseline document depth, so that the region 208 corresponding to the document 202 does not include any part of the background surface 205. In FIG. 2I, the boundary 212B has also been rotated counterclockwise and the boundary 212C shortened to include pixel groups adjacent to the document 202 at the baseline document depth, so that the corresponding document region 208 includes every part of the document 202. The region 208 thus coincides and aligns with the actual document 202 within the image 206.

Referring back to FIG. 1, the method 100 can include performing OCR (or another image processing or other action) on the document within the digitally captured image from which the artifact has been removed (124). OCR may be performed on the identified document region of the image from which the artifact has been removed, for instance, after document boundary adjustment. For example, as to the artifact-removed document 202 within the image 206 of FIG. 2I, OCR may be performed on the boundary-adjusted document region 208. The method 100 may include other actions in addition to and/or in lieu of OCR, such as saving and/or printing the artifact-removed digitally captured image.

FIG. 3 shows an example non-transitory computer readable data storage medium 300 storing program code 302 executable by a processor to perform processing. The processing can include determining depth information for each pixel of a digitally captured image of a document occluded by an object (102). The processing can include identifying the pixels for which the depth information is indicative of a greater depth than a baseline depth of the document as belonging to an artifact corresponding to the object occluding the document (112). The processing can include removing the artifact from the digitally captured image (114).

FIG. 4 shows an example computing device 400. The computing device 400 includes image-capturing hardware 402, such as a camera and/or one or multiple image-capturing sensors, to digitally capture an image of a document occluded by an object. The computing device includes a processor 404 and a memory 406 storing program code 408. The program code 408 is executable by the processor 404 to determine depth information for each pixel of the image (102). The program code 408 is executable by the processor 404 to remove the pixels from the image for which the depth information is indicative of a greater depth than a baseline depth of the document (114).

Techniques have been described for removing artifacts from a digitally captured image of a document that correspond to document-occluding objects within the image. The techniques utilize depth information of the pixels of the image to distinguish the artifacts from other parts of the document. The techniques can thus improve OCR, in that OCR performed on the resulting image may have increased accuracy.

I claim:

1. A non-transitory computer-readable data storage medium storing program code executable by a processor to perform processing comprising:

determining depth information for each pixel of a plurality of pixels of a digitally captured image of a document occluded by an object;

identifying boundaries of the document within the digitally captured image;

determining a baseline depth of the document from the depth information for the pixels inside the document boundaries;

identifying the pixels for which the depth information is indicative of a greater depth than the baseline depth of the document as belonging to an artifact corresponding to the object occluding the document; and removing the artifact from the digitally captured image.

2. The non-transitory computer-readable data storage medium of claim 1, wherein the processing further comprises:

performing optical character recognition (OCR) on the document within the digitally captured image from which the artifact has been removed.

3. The non-transitory computer-readable data storage medium of claim 1, wherein identifying the boundaries of the document within the digitally captured image comprises:

segmenting the image into a plurality of regions without using the depth information;

identifying the segmented region corresponding to the document, boundaries of the segmented region corresponding to the document as the boundaries of the document within the digitally captured image.

4. The non-transitory computer-readable data storage medium of claim 3, wherein the segmented region corresponding to the document is polygonal in shape, each boundary of the segmented region is linear, and pairs of adjacent boundaries of the segmented region each meet at a corner.

5. The non-transitory computer-readable data storage medium of claim 1, wherein determining the baseline depth of the document from the depth information for the pixels inside the document boundaries comprises:

determining the baseline depth as a most frequent depth indicated by the depth information for the pixels inside the document boundaries, within a threshold.

6. The non-transitory computer-readable data storage medium of claim 1, wherein identifying the pixels for which the depth information is indicative of the greater depth than the baseline depth of the document as belonging to the artifact comprises:

identifying the pixels inside the document boundaries and for which the depth information is indicative of the greater depth as belonging to the artifact.

7. The non-transitory computer-readable data storage medium of claim 6, wherein identifying the pixels for which the depth information is indicative of the greater depth than the baseline depth of the document as belonging to the artifact further comprises:

identifying the pixels outside the document boundaries and for which the depth information is indicative of the greater depth as belonging to the artifact.

8. The non-transitory computer-readable data storage medium of claim 1, wherein the processing further comprises:

adjusting the document boundaries to include groups of the pixels outside the boundaries, which are adjacent to the document within the digitally captured image, and for which the depth information is indicative of the baseline depth of the document.

9. The non-transitory computer-readable data storage medium of claim 1, wherein the processing further comprises:

adjusting the document boundaries to exclude groups of the pixels inside the boundaries and for which the depth information is indicative of a lower depth than the baseline depth of the document.

10. The non-transitory computer-readable data storage medium of claim 1, wherein removing the artifact from the digitally captured image comprises:

setting each pixel belonging to the artifact to a minimum pixel value.

11. The non-transitory computer-readable data storage medium of claim 10, wherein removing the artifact from the digitally captured image comprises:

inpainting groups of the pixels set to the minimum pixel value.

12. A computing device comprising:

image-capturing hardware to digitally capture an image of a document occluded by an object, the image having a plurality of pixels;

a processor; and a memory storing program code executable by the processor to:

determine depth information for each pixel of the image;

identify boundaries of the document within the image;

determine a baseline depth of the document from the depth information for the pixels inside the document boundaries; and remove the pixels from the image for which the depth information is indicative of a greater depth than the baseline depth of the document.

13. The computing device of claim 12, wherein the program code is executable by the processor to further:

perform optical character recognition (OCR) on the document within the image from which the pixels have been removed.

* * * * *